United States Patent
Tashiro et al.

[11] Patent Number: 6,111,404
[45] Date of Patent: Aug. 29, 2000

[54] STRUCTURE OF A PROJECTION FOR AN ELECTROMAGNETIC PICK-UP IN A ROTOR

[75] Inventors: Masahiko Tashiro; Takashi Taguchi, both of Saitama, Japan

[73] Assignee: Honda Giken Koygo Kabushiki Kaisha, Tokyo, Japan

[21] Appl. No.: 09/013,257

[22] Filed: Jan. 26, 1998

[30] Foreign Application Priority Data

Jan. 31, 1997 [JP] Japan ................................ 9-018298

[51] Int. Cl.⁷ .................................................. G01B 7/14
[52] U.S. Cl. ............................ 324/207.22; 324/207.25
[58] Field of Search ........................... 324/173, 174, 324/207.25, 207.22; 384/448; 188/181 R; 310/168; 24/894, 844.35, 844.353

[56] References Cited

U.S. PATENT DOCUMENTS 3,961,215 6/1976 Gee et al. ................................ 310/168

5,053,656 10/1991 Hodge ................................ 324/207.22

FOREIGN PATENT DOCUMENTS 62-96860 5/1987 Japan .

*Primary Examiner*—Walter E. Snow
*Attorney, Agent, or Firm*—Armstrong, Westerman, Hattori, McLeland & Naughton

[57] ABSTRACT

A detected projection is integrally provided on one side of a rotor produced by pressing a plate material. A portion of a rotor is allowed to bulge from one side of the rotor by pressing. At least one end of the projection in a circumferential direction of the rotor is comprised of a shear end face steeply rising from the side of the rotor by a shearing effect during pressing. The shear end face is formed as a sensing end face for an electromagnetic pick-up. The detected projection generates a rotation detecting pulse in an electromagnetic pick-up disposed in proximity to the rotor. The accuracy in size of the projection is enhanced and moreover, when the projection is detected by the electromagnetic pick-up, a pulse wave form is generated clearly and sharply, thereby enhancing the sensing accuracy.

7 Claims, 12 Drawing Sheets

FIG.6C
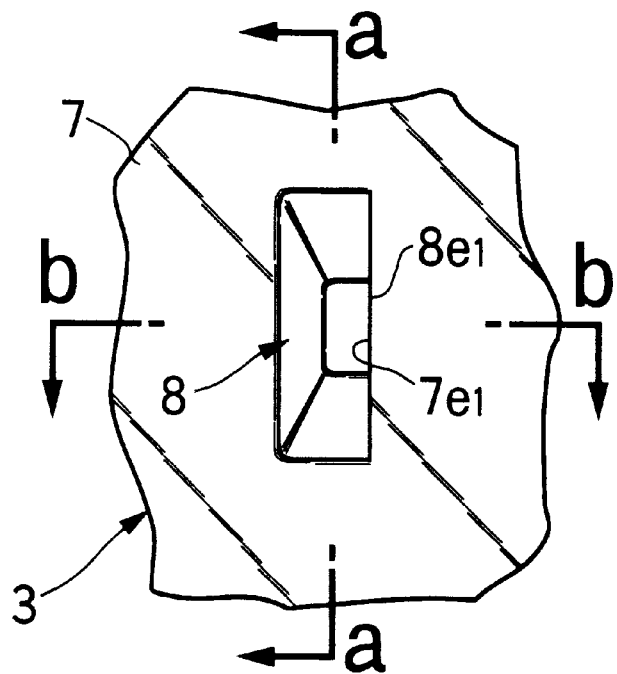
FIG.6B
FIG.6A
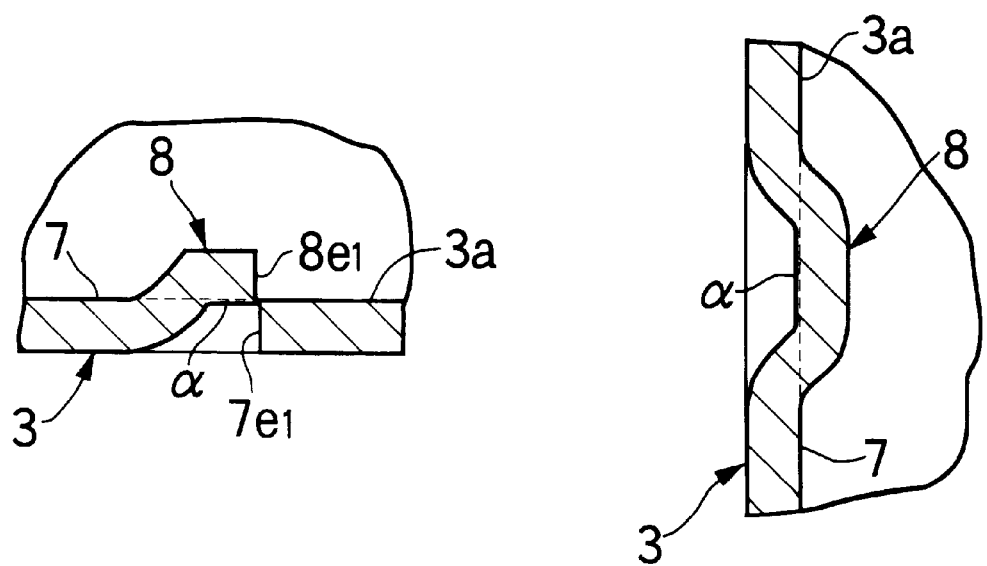

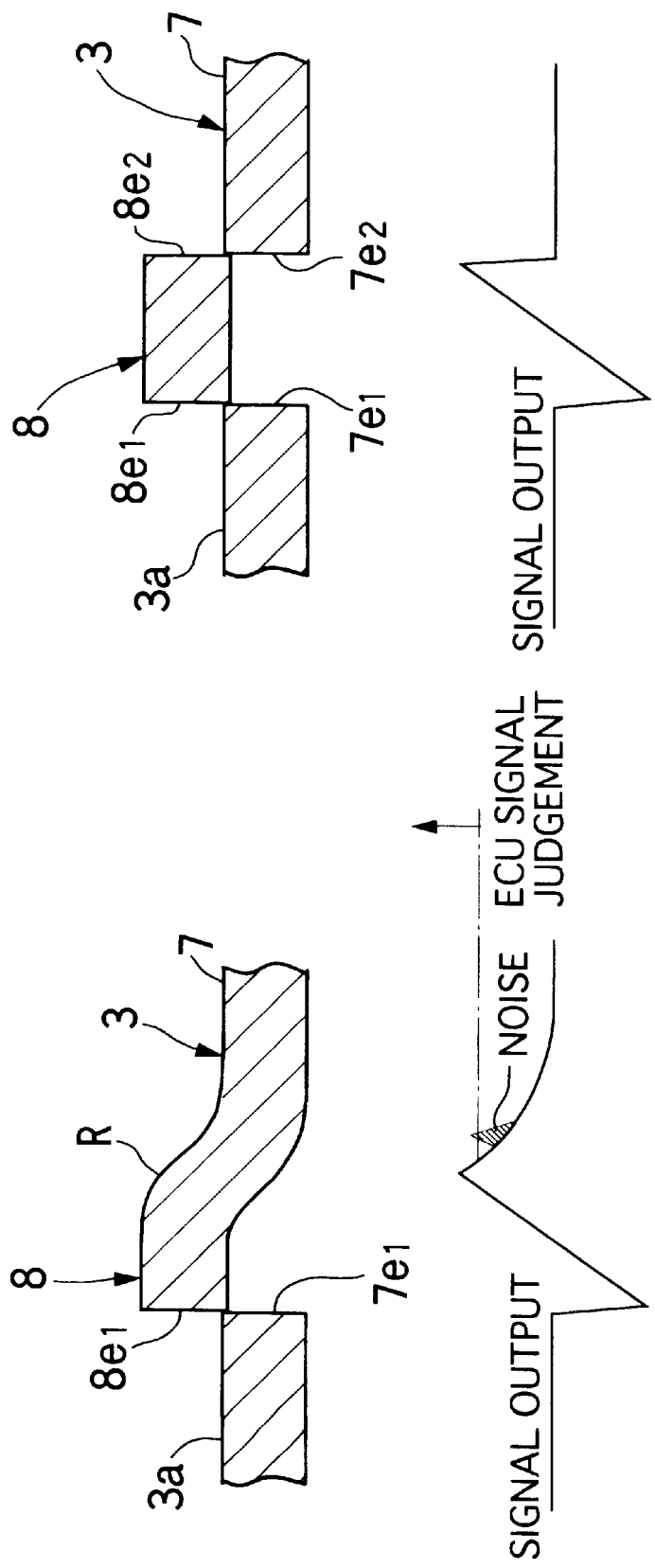

STRUCTURE OF A PROJECTION FOR AN ELECTROMAGNETIC PICK-UP IN A ROTOR

BACKGROUND OF THE INVENTION

1. Field of the Invention

The present invention relates to a structure of a projection for an electromagnetic pick-up in a rotor, comprising a detecting projection provided on one side of a rotor, such as a pulley, for generating a rotation detecting pulse in an electromagnetic pick-up disposed in proximity to the one side.

2. Description of Related Art

A pulley having a pulley body which is integrally provided with detecting projections of the above-described type for the electromagnetic pick-up for the purpose of reducing the number of parts and the number of assembling steps is conventionally known. For example, Japanese Patent Application Laid-open No. 62-96860 describes such a pulley.

It is conventionally known that in producing a pulley body integrally provided with detecting projections of the above-described type for the electromagnetic pick-up in the above manner, the pulley body may be formed from a sintered material. In this case, the projection is formed simultaneously with the formation of the sintered material from a green compact.

It is also known that a pulley body may be formed by casting and after this formation, a projection of the above-described type is formed by cutting.

Further, it is known that a pulley body may be formed by pressing a plate material. In this case, a projection of the above-described type is merely formed into a protrusion-shape by a forming die.

However, when the pulley body is formed from the sintered material, as described above, it is difficult to produce a larger pulley body because of production equipment.

In addition, when the pulley body is formed by casting, and after this formation, the projection is formed by cutting, high working accuracy is required, resulting in increased cost due to the large amount of time required and difficulty associated with mass production.

Further, when the pulley body is formed by pressing the plate material, there is an advantage that a relatively large pulley body can be mass-produced inexpensively. However, the projection is merely formed to bulge into a protrusion shape upon the pressing, having a poor accuracy in size. Moreover, the formed projection assumes a gentle or rounded profile. For this reason, when the projection is detected by the electromagnetic pick-up, a pulse cannot be outputted sharply. If the output pulse has a gentle profile, when noise is generated and superimposed on such an output pulse, there is a possibility that a control unit (such as an ECU), which operates in response to the pulse, may misjudge the signal.

SUMMARY

The present invention has been accomplished with such circumstances in mind, and it is an object of the present invention to provide a structure of a projection for an electromagnetic pick-up in a rotor, wherein even if a rotor such as a pulley body or the like is formed by pressing, the accuracy in size of the detected projection can be enhanced and moreover, a sensing end face of the projection for the electromagnetic pick-up can be formed sharply, thereby enhancing the detecting accuracy.

A projection for generating a rotation detection pulse in an electromagnetic pick-up is formed by allowing a portion of a rotor to bulge from one side of the rotor by pressing. At least one end face of the projection in the circumferential direction of the rotor includes a shear face produced on the projection to steeply rise from the one side due to the shearing effect during pressing. The shear face is formed as the sensing end face for the electromagnetic pick-up. Therefore, the sensing end face can be formed to steeply rise from the one side by the shearing effect during pressing and hence, the accuracy in size of the projection can be enhanced. When the projection is detected by the electromagnetic pick-up, a pulse is generated clearly and sharply. Thus, even in an environment where noise is generated and superimposed on the pulse, good sensing can be performed. In general, this can largely contribute to an enhancement in sensing accuracy. Moreover, by the fact that the projection is formed by pressing, so that at least one end face thereof is formed as a shear face, the protrusion amount of the projection can be corrected relatively simply by a hammer or the like.

Additionally, the sensing end faces of the opposite ends of the projection in the circumferential direction of the rotor can be accurately formed to steeply rise from the remainder of the rotor and include an edge-like shape by the shearing effect during pressing. Therefore, when the sensing end faces are detected by the electromagnetic pick-up, starting and terminating ends of a pulse are generated clearly and sharply and hence, the sensing accuracy can be further enhanced.

The electromagnetic pick-up may be disposed to protrude into an annular recess of the rotor, so that the electromagnetic pick-up can be opposed and in proximity to each projection formed on the bottom surface of the annular recess of the rotor. The rotor may be formed as a transmitting pulley. The shear faces of the projection and the shear faces of the depression left in the rotor by the projection may partially overlap each other to close any gap therebetween. Therefore, the external environment such as water, mud, pebbles and the like, can be prevented from entering into the recess of the pulley body, preventing damage and deterioration of the electromagnetic pick-up. If the surface of the pulley (or rotor) is subjected to a coating, prevention of damage and deterioration of the electromagnetic pick-up can be further enhanced.

As used in the present invention, the term "sensing end face" means a face of the projection, which is to be detected by the electromagnetic pick-up and which corresponds to a starting or terminating end of a pulse outputted by the electromagnetic pick-up in response to the movement of a single projection during rotation of the rotor. Other features and advantages will become obvious to those skilled in the art in view of accompanying description and drawings of several examples of the invention.

The mode for carrying out the present invention will now be described by way of the embodiments shown in the accompanying drawings.

BRIEF DESCRIPTION OF THE DRAWINGS

FIGS. 6A, 6B and 6C are views of a driving pulley according to a second embodiment, FIG. 6C being an enlarged plan view similar to FIG. 2, FIG. 6A being a sectional view taken along a line a—a in FIG. 6C, and FIG. 6B being a sectional view taken along a line b—b in FIG. 6C.

FIGS. 9A and 9B are diagrams for explaining a difference between signal outputs due to a difference between shapes of projections.

DETAILED DESCRIPTION

Figure 1:
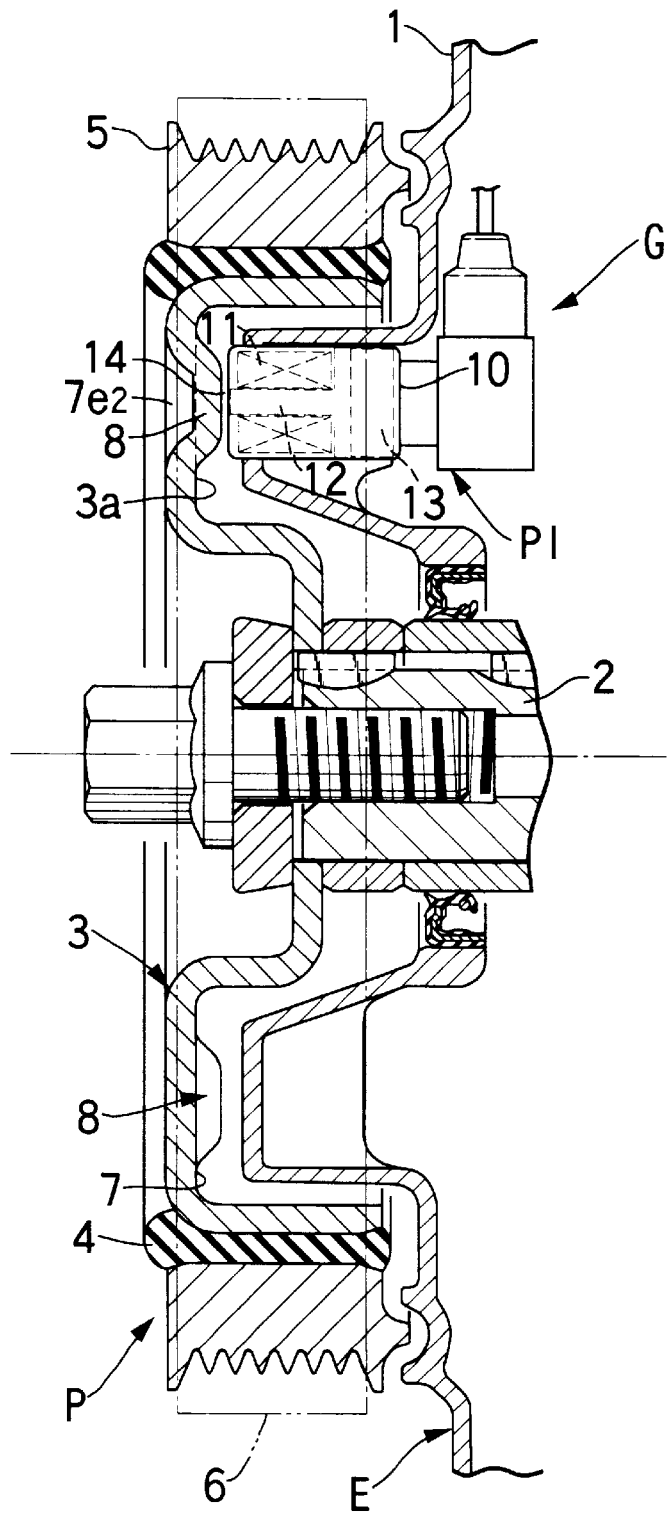
FIG. 1 illustrates a vertical sectional view of an internal combustion engine including a driving pulley for auxiliary equipment according to a first embodiment of the present invention.
Figure 2:
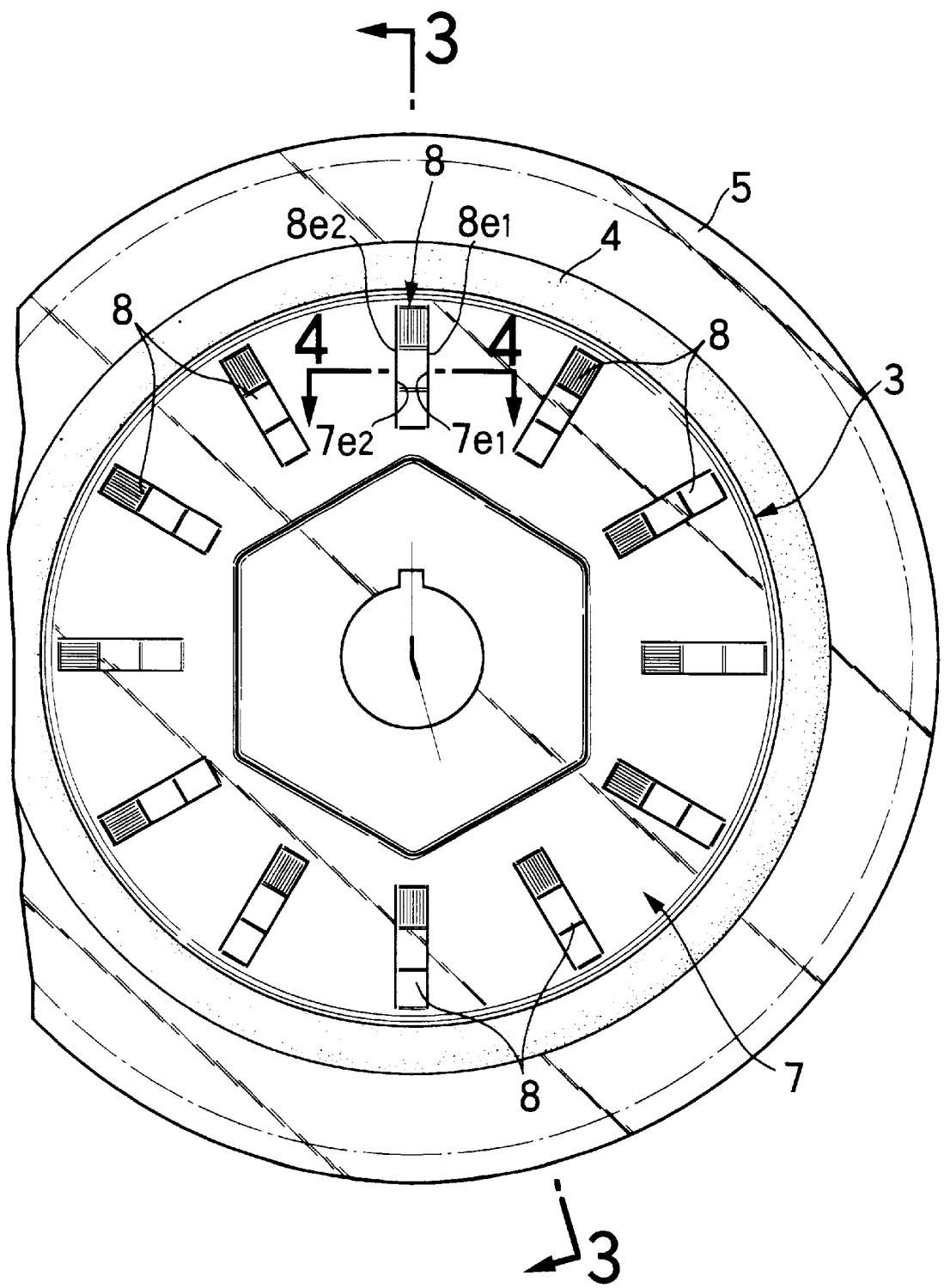
FIG. 2 is a plan view of the driving pulley according to the first embodiment.
Figure 3:
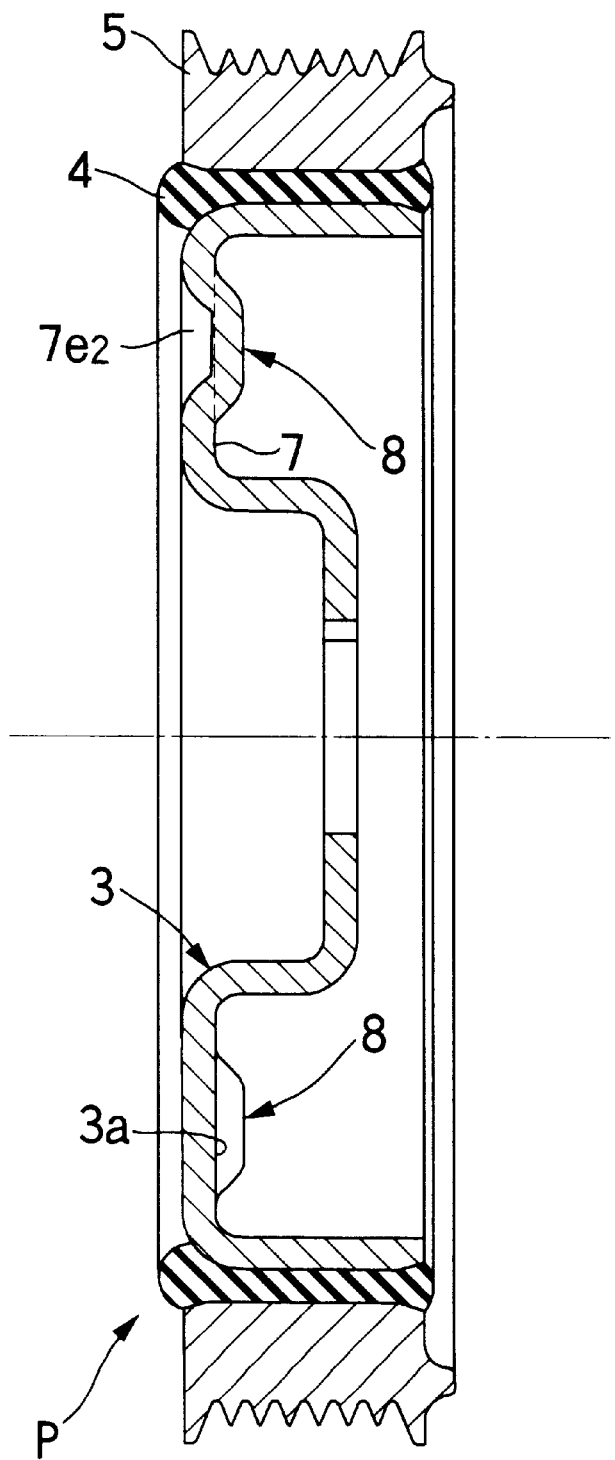
FIG. 3 is a sectional view taken along a line 3—3 in FIG. 2.

Referring first to FIG. 1, one end of a crankshaft 2, rotatably supported on an engine body 1 of an internal combustion engine E, protrudes from one side of the engine body 1. A driving pulley P for driving auxiliary equipment, (not shown) such as an oil pump, is secured to the protruding end. An electromagnetic pick-up PI of a panel generator G for detecting the rotation of the crankshaft 2 is fixed to one side of the engine body 1 so that a front surface of the pick-up is opposed to and close to an inner side of the driving pulley P.

The driving pulley P includes a pulley body 3 fixed to the crankshaft 2, and a grooved ring 5 connected to an outer periphery of the pulley body 3 through an annular rubber damper 4. A transmitting belt 6 for the auxiliary equipment is reeved around the grooved ring 5, so that the auxiliary equipment (not shown) can be rotated by the belt 6.

The pulley body 3 is made by pressing a magnetic metal plate such as a is steel plate, and constitutes a rotor according to the embodiment of the present invention. A recess 7 is formed in one side 3a of the pulley body 3 (a side opposite to the engine body 1 in the illustrated embodiment) by the pressed formation of the pulley body 3. The recess 7 thus extends in an annular shape to surround the center of rotation of the pulley body 3. A main portion of the electromagnetic pick-up PI is placed to protrude into the recess 7. A plurality of detected projections 8 for generating a rotation-detecting pulse current (or signal) in the electromagnetic pick-up PI are integrally provided on a bottom of the recess 7 of the pulley body 3 at distances equally spaced apart from one another circumferentially.

Each of the projections 8 is formed by allowing a portion of the pulley body 3 to bulge from the above-described one side 3a (the bottom of the recess 7 in the illustrated embodiment) while pressing the pulley body 3, or by a secondary pressing step after such a pressing of pulley body 3. Moreover, opposite ends of each of the projections 8 in the circumferential direction of the pulley body 3 include a pair of parallel shear faces $8e_1$ and $8e_2$ created to steeply rise at right angles from the one side 3a of the pulley body 3 by a shearing action in the pressing. The shear faces $8e_1$ and $8e_2$ are used as sensing end faces (a starting end face and a terminating end face) for the electromagnetic pick-up PI.

Figure 4:
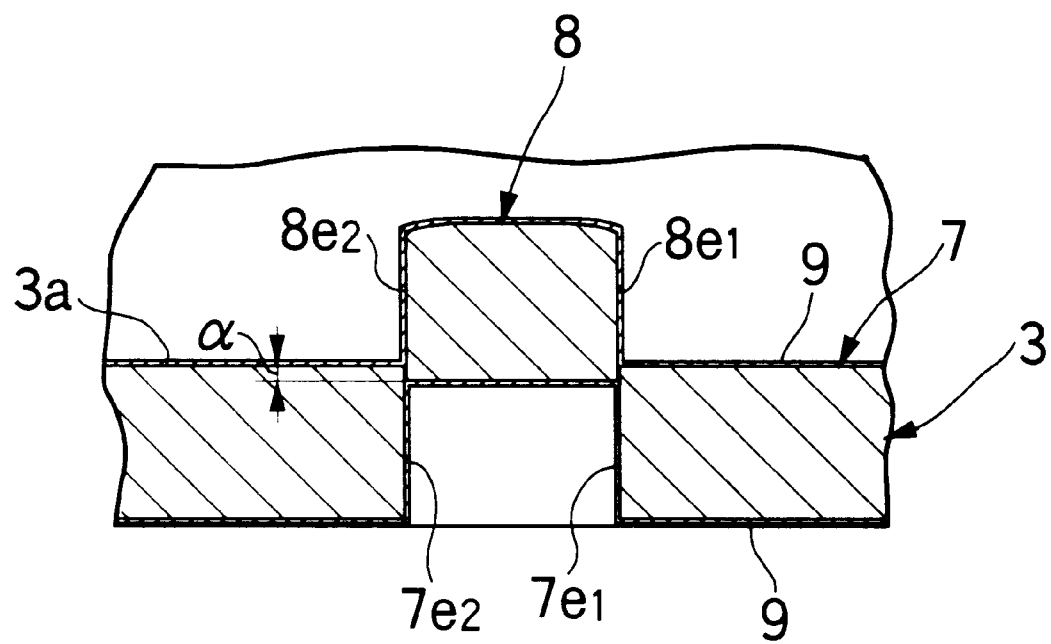
FIG. 4 is an enlarged sectional view taken along a line 4—4 in FIG. 2.

Sheer end faces $7e_1$ and $7e_2$ may be created during the formation of projections 8 in the depression left in pulley body 3 on the side opposite side 3a. (See FIG. 4, for example.) Sheer end faces $7e_1$ and $7e_2$ respectively overlap shear end faces $8e_1$ and $8e_2$ by a predetermined distance α (0.5 mm in the illustrated embodiment) in a pressing direction to prevent or close a gap therebetween. Thus, it is possible to effectively prevent water, mud or pebbles, for example, from entering into the inside of the pulley body 3 (through the bottom of the recess 7) from the outside of the pulley body 3, thus preventing damage and deterioration of the electromagnetic pick-up PI. Moreover, in the illustrated embodiment, the surface of the pulley body 3 is subjected to a coating after the pressing formation. The coating film 9 (see FIG. 4) is further effective to prevent water, mud or pebbles from entering into the pulley body 7 by closing the very small gaps between the shear end faces $8e_1$ and $7e_1$, $8e_2$ and $7e_2$, thereby enhancing the effect of preventing the damage and deterioration of the electromagnetic pick-up PI. In FIG. 4, a portion of a tip end face of the projection 8 closer to each shear end face $8e_1$, $8e_2$ is chamfered shallowly by a slight cutting after the formation of the projection 8 in the pressing manner, but such chamfering may be omitted if it is not required.

The electromagnetic pick-up PI includes an iron core 12 having a coil 11, a permanent magnet 13, a yoke (not shown) and the like within a housing 10 made of a synthetic resin, as conventionally well-known, and is fixedly supported on one side of the engine body 1 by a suitable fixing means. In this case, the electromagnetic pick-up PI is disposed, so that a front surface of the iron core 12 thereof is opposed and close to each projection 8 with a small gap 14 left therebetween as each projection 8 rotates past the iron core 12.

The operation of the embodiment will be described below. During operation of the internal combustion engine E, the driving pulley P is always rotated in unison with the crankshaft 2, and such rotation is transmitted to the auxiliary equipment (not shown) via the transmitting belt 6 for driving the auxiliary equipment. When the projection 8 on the inner surface of the driving pulley P is moved toward and past the front surface of the iron core 12 of the electromagnetic pick-up PI in unison with the rotation of the driving pulley P, a large change in magnetic flux occurs around the coil 11, and a pulse current is induced in the coil 11 by this change in magnetic flux. This pulse is transmitted to a control unit (not shown) such as ECU for use as a control signal for operating, for example, an ignition device or a fuel injection device (both not shown). The pulse outputting function of the electromagnetic pick-up PI is conventionally well-known.

Each of the projections 8 is formed by allowing the portion of the pulley body 3 to bulge from the one side 3a of the pulley body 3 (the bottom of the recess 7 in the illustrated embodiment) by a shearing effect and a forcing-out effect in the formation of the pulley body 3 by pressing. Moreover, the opposite end faces of each of the projections 8 in the circumferential direction of the rotor include the pair of parallel shear end faces $8e_1$ and $8e_2$ created on the side of the projection 8 to steeply rise from the one side 3a of the pulley body 3 (the bottom of the recess 7 in the illustrated embodiment) by the shearing effect in the pressing formation. The shear end faces $8e_1$ and $8e_2$ serve as the sensing end faces for the electromagnetic pick-up PI. Therefore, the sensing end faces can be formed to steeply rise in an edge-like shape with good accuracy by the shearing effect during pressing, so that the pulse (especially, both the starting and terminating ends of the pulse) is generated clearly and sharply when the projection 8 is detected by the electromagnetic pick-up PI. Thus, even under an environment where noise is generated and superimposed on such output pulse, good sensing can be achieved. Moreover, because each of the projections 8 is formed by pressing so that the opposite ends thereof are formed as the shear end faces $8e_1$ and $8e_2$, the protruding amount of the projection 8 can be easily corrected by a hammer or the like.

Figure 5:
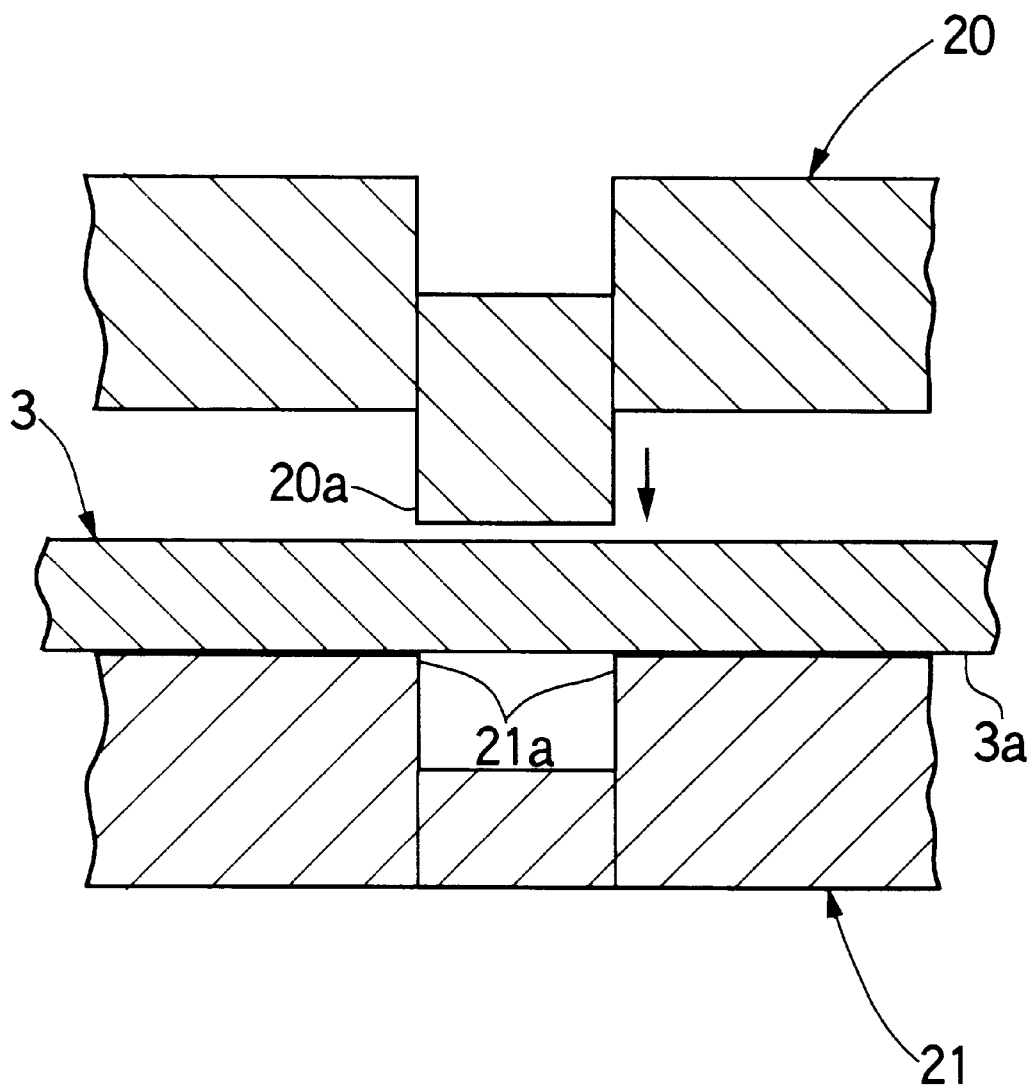
FIG. 5 is a sectional view of a mold for forming the driving pulley by pressing.

In forming such projections 8, it is possible to employ a commonly known pressing process. In the illustrated embodiment, a pressing mold is used which includes a pair of dies 20 and 21 which are capable of being advanced toward and retreated from each other and which have a male shearing edge 20a and a female shearing edge 21a corresponding to the projection 8, for example, as shown in FIG. 5. The projection 8 can be formed to bulge from the one side 3a of the pulley 3 by forcing out a portion of the pulley body 3 while shearing it by vigorously clamping the pulley body 3 between the male and female shearing edges 20a and 21a. In using this pressing mold, the shape, dimension, pressing load, and the like of the male and female shearing edges 20a and 21a can be suitably set so as to allow the pressing (shearing) to be performed without difficulty. In the illustrated embodiment, for example, when a projection 8 with a protrusion amount of 3.5 mm from a steel plate having a thickness of 4 mm before pressing is to be formed by a pressing machine of 50 tons, the width of the male shearing die 20a is set at 4.5 mm, and the protrusion amount is set at 4.6 mm, while the width of the female shearing die 21a is set at 5.0 mm and the depression amount is set at 4.3 mm.

A second embodiment of the present invention is shown in FIG. 6. Even in the second embodiment, each projection 8 is formed by forcing out a portion of the pulley body 3 (the bottom of the recess 7 in the illustrated embodiment) to bulge one side 3a of the body 3 by the shearing effect and the forcing-out effect during pressing of the pulley body 3. In the second embodiment, only one end face of each projection 8 in the circumferential direction of the pulley body 3 is formed as a shear face $8e_1$. The single shear face $8e_1$ serves as a sensing end face (a staring end face or a terminating end face) for the electromagnetic pick-up PI and hence, the sensing end face can be formed to steeply rise into an edge-like shape with a good accuracy by the shearing effect during pressing, as in the previously described embodiment. Therefore, when the projection 8 is detected by the electromagnetic pick-up PI, either of the start or end of a pulse can be generated clearly and sharply.

Figure 7C:
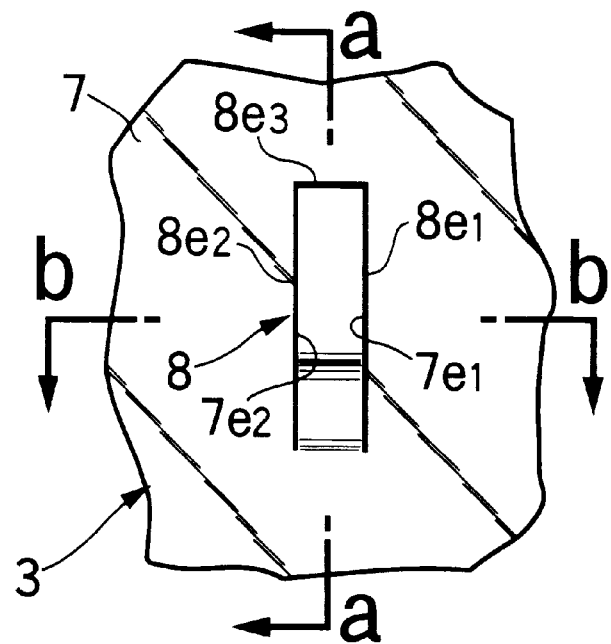
FIGS. 7A, 7B and 7C are views of a driving pulley according to a third embodiment, FIG. 7C being an enlarged plan view similar to FIG. 2, FIG. 7A being a sectional view taken along a line a—a in FIG. 7C, and FIG. 7B being a sectional view taken along a line b—b in FIG. 7C.
Figure 7B:
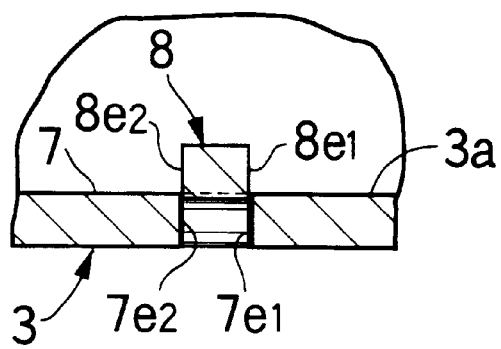
Figure 7A:
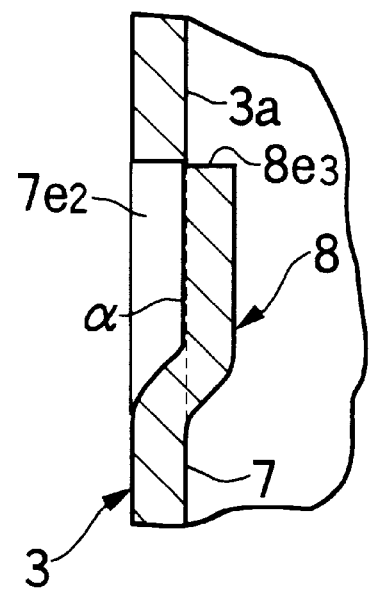

A third embodiment of the present invention is shown in FIG. 7. Even in the third embodiment, each projection 8 formed by forcing out a portion of the pulley body 3 (the bottom of the recess 7 in the illustrated embodiment) to bulge from the one side 3a of the body 3 by the shearing effect and the forcing-out effect during pressing of the pulley body 3. In the third embodiment, three shear end faces are created: opposite end faces $8e_1$ and $8e_2$ of each projection 8 facing the circumferential direction of the pulley body 3 and an end face $8e_3$ of the projection 8 facing the radial direction of the pulley body 3. Sheer end faces $8e_1$, $8e_2$ and $8e_3$ serve as sensing end faces for the electromagnetic pick-up PI. Therefore, the sensing end faces are formed to steeply rise into an edge-like shape with a good accuracy by the shearing effect during pressing and hence, in the third embodiment, a function and effect similar to those in the first embodiment can be achieved.

Figure 8C:
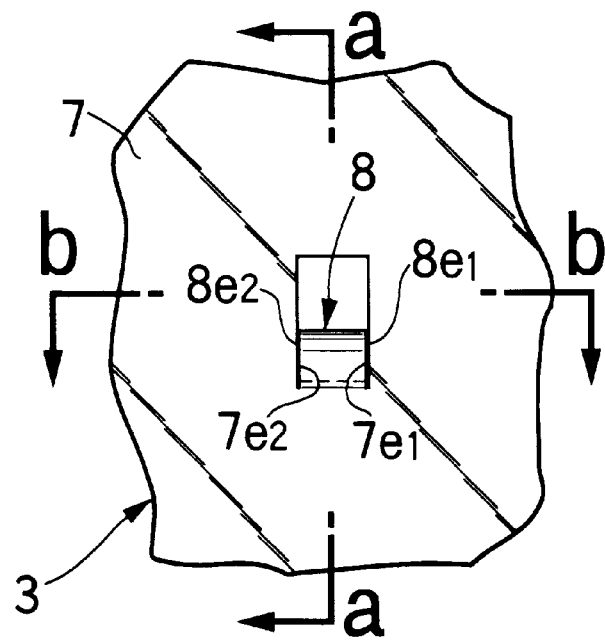
FIGS. 8A, 8B and 8C are views of a driving pulley according to a fourth embodiment, FIG. 8C being an enlarged plan view similar to FIG. 2, FIG. 8A being a sectional view taken along a line a—a in FIG. 8C, and FIG. 8B being a sectional view taken along a line b—b in FIG. 8C.
Figure 8B:
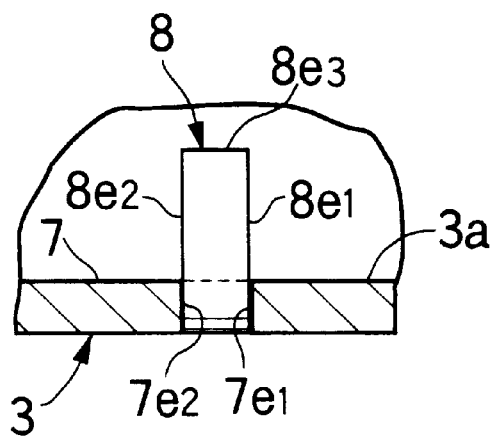
Figure 8A:
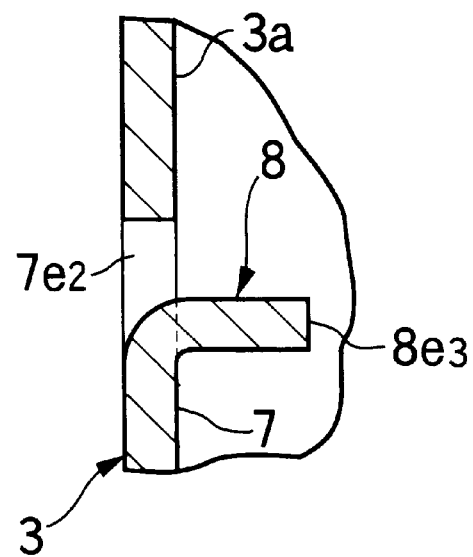

A fourth embodiment of the present invention is shown in FIG. 8. In the fourth embodiment, each projection 8 is formed from a portion of the pulley body 3 on one side 3a of the pulley body 3 (the bottom of the recess 7 in the illustrated embodiment) by the shearing effect and a folding effect during the formation of the pulley body 3 in the pressing manner. Thus, in the fourth embodiment, three shear faces are formed: opposite end faces $8e_1$ and $8e_2$ of each projection 8 facing the circumferential direction of the pulley body 3 and end face $8e_3$ of each projection 8 facing the radial direction of pulley body 3. Each projection 8 is formed by folding a portion surrounded by the shear faces substantially through 90 degrees substantially simultaneously with the formation of the shear faces $8e_1$, $8e_2$ and $8e_3$. Even in the fourth embodiment, the shear faces $8e_1$, $8e_2$ and $8e_3$ serve as sensing end faces for the electromagnetic pick-up PI and hence, a function and effect similar to those in the first and third embodiments can be achieved. Further, compared with the first embodiment, the third and fourth embodiments have an advantage of having an additional sensing end face in a direction different from the other sensing end faces.

FIGS. 9A and 9B are a schematic diagrams for explaining a difference between signal outputs (pulse wave forms) due to a difference between the shapes of the projections 8. FIG. 9A corresponds to a case where opposite end faces of each projection 8 in the circumferential direction of the pulley body 3 serve as shear end faces $8e_1$ and $8e_2$ (which corresponds to the first, third and fourth embodiments), and FIG. 9B corresponds to a case where only one end of each projection 8 in the circumferential direction of the pulley body 3 is a shear face $8e_1$ (which corresponds to the second embodiment). In the case shown in FIG. 9A, any of the opposite end faces of the projection 8 in the circumferential direction of the pulley body 3 can be formed to steeply rise into the edge-like shape with the good accuracy and hence, when they are detected by the electromagnetic pick-up, the starting and terminating ends of a pulse wave form can be generated clearly and sharply. This is convenient for enhancing the accuracy of the sensing. On the other hand, in the case shown in FIG. 9B, only the one end face of the projection 8 in the circumferential direction of the pulley body 3 rises into the edge-like shape and hence, the pulse rises steeply, but drops relatively gently. Therefore, if noise is generated and superimposed on the pulse, there is a possibility that the control unit (an ECU, e.g.) misjudges a signal and further, there is a disadvantage of poor accuracy in the size of corner R of the cross section of the projection 8.

Although the embodiments of the present invention have been described in detail, it will be understood that the present invention is not limited to the above-described detailed examples, and various modifications in design may be made without departing from the spirit and scope of the invention defined in claims. For example, the shear faces $8e_1$ and $7e_1$, $8e_2$ and $7e_2$ of each projection 8 and the portion of the pulley body 3 around the projection 8 have been shown as overlapping each other by a predetermined distance in the pressing direction to close the gap therebetween in each of the embodiments, but according to the present invention, the overlapping portions of the shear faces may be eliminated, so that a gap may be created between each projection 8 and a portion of the pulley body 3 around the projection 8.

Figure 10:
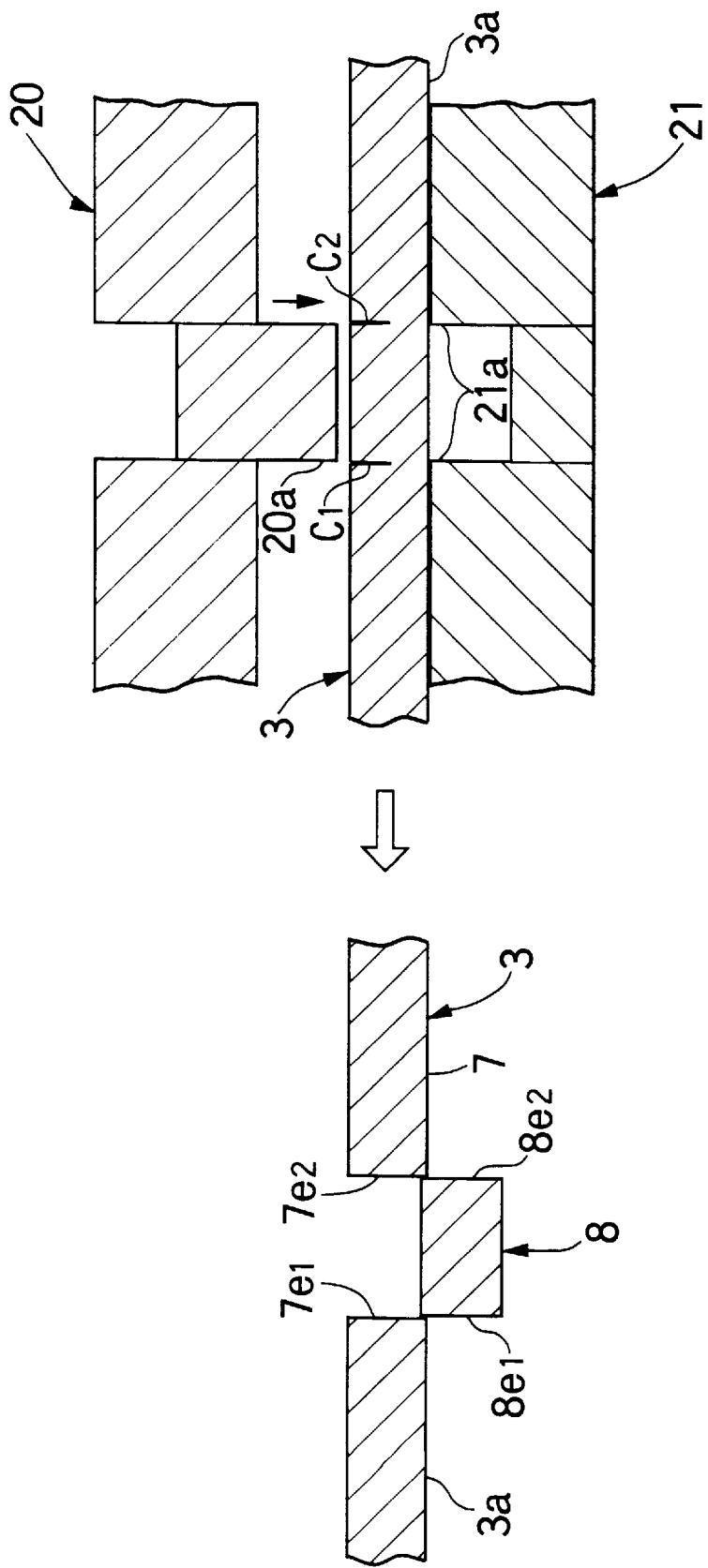
FIG. 10 is a diagram for briefly explaining a forming procedure including a step of previously making a cutout on one side of a pulley body prior to a pressing step.
Figure 11:
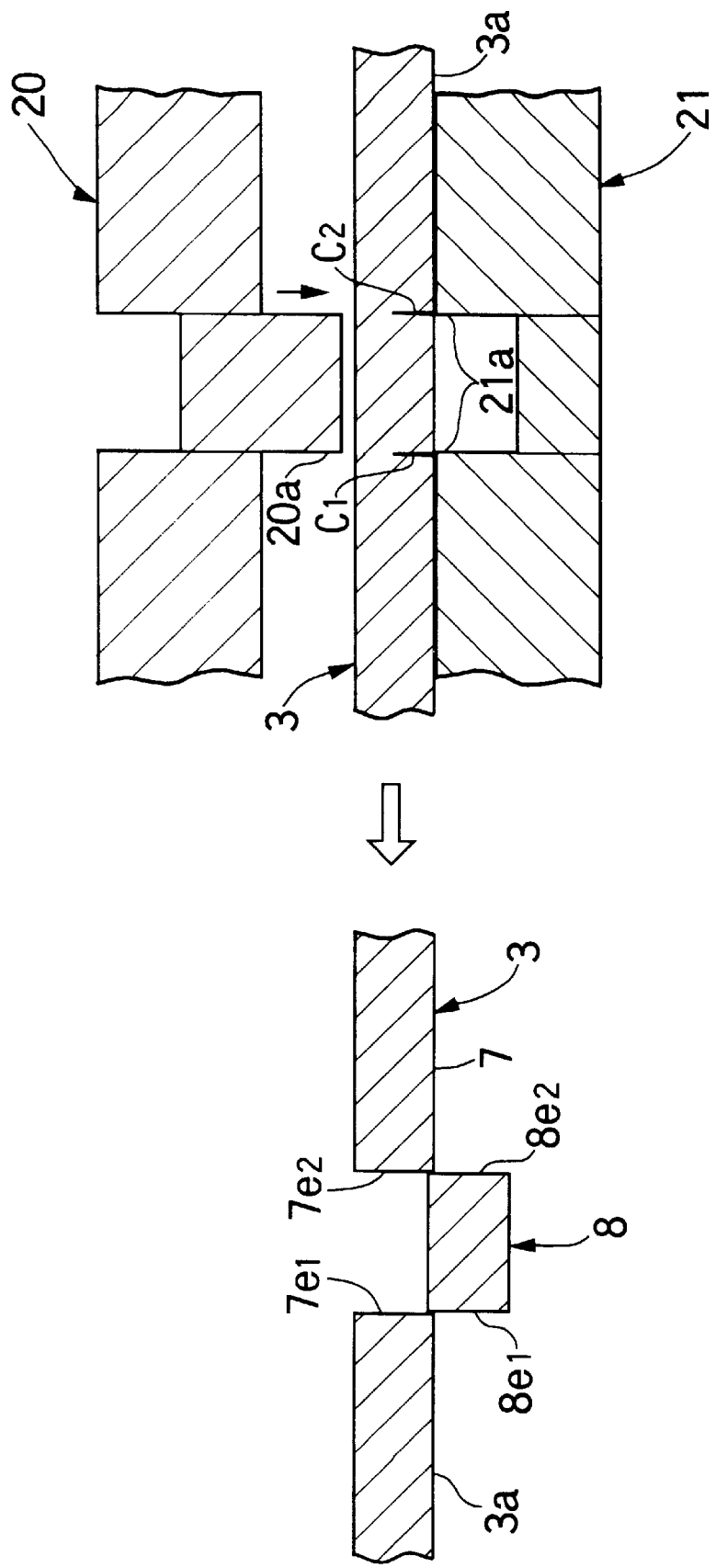
FIG. 11 is a diagram for briefly explaining a forming procedure including a step of previously making a cutout on the other side of the pulley body prior to the pressing step.
Figure 12:
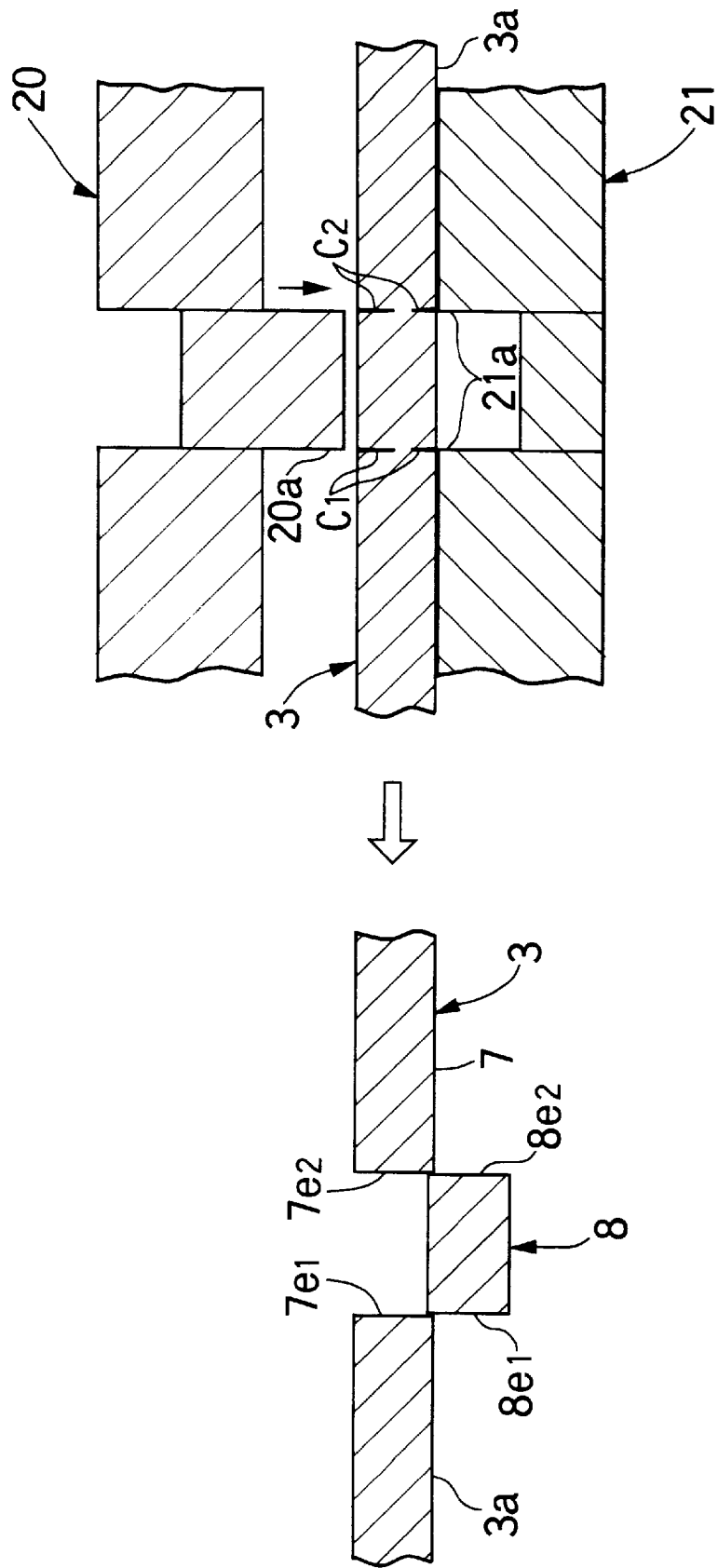
FIG. 12 is a diagram for briefly explaining a forming procedure including a step of previously making cutouts on both the one and the other sides of the pulley body prior to the pressing step.

In addition, the pulley body 3 has been described as being subjected directly to pressing without previously conducting a pre-treatment for facilitating the shearing in each of the embodiments. However, as illustrated in FIGS. 10 and 11, cutouts $C_1$ and $C_2$ may be previously made at locations on one side or the other side of the pulley body 3, which are intended to form shear faces $8e_1$ and $8e_2$ or as illustrated in FIG. 12, cutouts $C_1$ and $C_2$ may be previously made at locations on both the one side and the other side of the pulley body 3, which are intended to form the shear faces $8e_1$ and $8e_2$, and upon the pressing, opposite ends of each of the cutouts $C_1$ and $C_2$ may be cut off to form the shear faces $8e_1$ and $8e_2$.

By making the cutouts $C_1$ and $C_2$, it is advantageously possible to perform the pressing smoothly with a relatively small pressing load. Especially, the case illustrated in FIG. 11 in which the cutouts $C_1$ and $C_2$ are made on the protruding side 3a of the pulley body 3 has an advantage that a burr does not remain on the sensing end faces (shearing faces) in the shearing. Furthermore, the case illustrated in FIG. 12 in which the cutouts $C_1$ and $C_2$ are made on both the sides of the pulley body 3 has an advantage of a remarkable reduction in the pressing load in addition to an advantage that the burr does not remain on the sensing end faces (shearing faces) in the shearing.

We claim:

1. A structure of a projection for an electromagnetic pick-up in a rotor, comprising:

at least one projection integrally provided on one side of a rotor produced by pressing a plate material, said at least one projection causing a rotation detecting pulse to be generated in an electromagnetic pick-up disposed in proximity to said one side of said rotor, wherein said at least one projection is formed by pressing a portion of the rotor to bulge from said one side, at least one of opposite end faces of said at least one projection facing a circumferential direction of said rotor including a shear cut face, steeply rising from said one side by a shearing effect of the pressing, said shear cut face being formed as a sensing end face for said electromagnetic pick-up, and wherein said rotor is a pulley body having a recess in said one side; said projection is formed on a bottom surface of said recess; said electromagnetic pick-up is disposed to protrude into said recess so as to come close to and face said projection; and said shear cut face of said projection and a shear cut face formed on said recess of said pulley body by pressing said projection partially overlap each other to prevent a gap therebetween.

2. A structure of a projection for an electromagnetic pick-up in a rotor according to claim 1, wherein said opposite end faces of said at least one projection in the circumferential direction of said rotor include a pair of parallel shear faces created on said projection, steeply rising from said one side by the shearing effect of the pressing, said shear faces being formed as sensing end faces for said electromagnetic pick-up.

3. A detection apparatus, using said rotor according to claim 1, wherein said recess is formed on a substantially planar portion of said rotor and each of said at least one projection is formed by pressing said substantially planar portion to include an end face substantially perpendicular to said substantially planar portion.

4. The apparatus of claim 3 wherein each of said at least one projection has a rectangular cross section perpendicular to a radial direction of said rotor.

5. The apparatus of claim 3 further comprising a crankshaft, connected to an engine said pulley, and a transmitting belt, wrapped about an exterior surface pulley to transmit power to auxiliary equipment.

6. A method of manufacturing said rotor according to claim 1, comprising:

cutting at least one side of the plate material to create at least one end face, which is substantially perpendicular to a major surface of said plate material, before creating the projection by pressing.

7. The method of claim 6 further comprising the step of adjusting the height of the created projection.

* * * * *